(12) United States Patent
Yoshida

(10) Patent No.: US 11,011,279 B2
(45) Date of Patent: May 18, 2021

(54) ALTERNATIVE CIRCULATION COOLING METHOD FOR EMERGENCY CORE COOLING SYSTEM, AND NUCLEAR POWER PLANT

(71) Applicant: Tokyo Electric Power Company Holdings, Inc., Tokyo (JP)

(72) Inventor: Akinobu Yoshida, Tokyo (JP)

(73) Assignee: TOKYO ELECTRIC POWER COMPANY HOLDINGS, INC., Tokyo (JP)

( * ) Notice: Subject to any disclaimer, the term of this patent is extended or adjusted under 35 U.S.C. 154(b) by 971 days.

(21) Appl. No.: 15/278,657

(22) Filed: Sep. 28, 2016

(65) Prior Publication Data
US 2017/0098482 A1  Apr. 6, 2017

(30) Foreign Application Priority Data
Oct. 2, 2015 (JP) .............................. JP2015-196741

(51) Int. Cl.
*G21C 15/12* (2006.01)
*G21C 15/18* (2006.01)

(52) U.S. Cl.
CPC ........... *G21C 15/12* (2013.01); *G21C 15/182* (2013.01); *Y02E 30/30* (2013.01)

(58) Field of Classification Search
CPC ...... G21C 15/00; G21C 15/18; G21C 15/182; G21C 15/185; G21C 15/187
See application file for complete search history.

(56) References Cited

U.S. PATENT DOCUMENTS

| 4,587,080 A * | 5/1986 | Johnson ................. G21C 15/18 376/282 |
| 2007/0007683 A1 | 4/2007 | Tobimatsu et al. |
| 2007/0076835 A1* | 4/2007 | Tobimatsu ............. G21C 9/004 376/280 |

FOREIGN PATENT DOCUMENTS

| JP | S54-155395 A | 12/1979 |
| JP | S61-034496 A | 3/1986 |

(Continued)

OTHER PUBLICATIONS

Decision to Grant a Patent in counterpart Japanese application JP 2015-196741 dated Jan. 7, 2020 (decision drafted Dec. 24, 2019) (English machine translation attached).

*Primary Examiner* — Marshall P O'Connor
(74) *Attorney, Agent, or Firm* — Venkatesh Krishnamoorthy; Silicon Valley Patent Group, LLP

(57) ABSTRACT

The present invention provides an alternative circulation cooling method for an emergency core cooling system that, even if the emergency core cooling system does not operate normally, can prevent the implementation of containment vessel venting by suppressing a rise in pressure and temperature in the containment vessel, and can suppress the implementation of dry-well venting even if containment vessel venting needs to be performed, as well as a nuclear power plant that is capable of the same. An alternative circulation cooling method for an emergency reactor core cooling system is performed at a nuclear power plant that includes an RHR system and a MUWC system. The method includes: connecting the downstream side of an RHR heat exchanger to the upstream side of a MUWC pump, and cooling water from a suppression chamber using the RHR heat exchanger and performing nuclear reactor injecting or containment vessel spraying using the MUWC pump.

2 Claims, 4 Drawing Sheets

(56) References Cited

FOREIGN PATENT DOCUMENTS

| JP | 08-114699 | 5/1996 |
| JP | 08-285983 | 11/1996 |
| JP | 2002-371888 A | 12/2002 |
| JP | 2012-230059 A | 5/2014 |

* cited by examiner

ALTERNATIVE CIRCULATION COOLING METHOD FOR EMERGENCY CORE COOLING SYSTEM, AND NUCLEAR POWER PLANT

CROSS-REFERENCE TO RELATED APPLICATIONS

This application is based upon and claims the benefit of priority from the prior Japanese Patent Application No. 2015-196741, filed on Oct. 2, 2015, the entire contents of which are incorporated herein by reference.

BACKGROUND OF THE INVENTION

Field of the Invention

The present invention relates to an alternative circulation cooling method for an emergency core cooling system at a nuclear power plant, and a nuclear power plant that is suited to the implementation of the same.

Background of the Invention

Boiling water reactor (BWR) nuclear power plants are provided with an emergency core cooling system (ECCS) for injecting a coolant into the core in order to cool it if the coolant in the core has become depleted. The nuclear reactor injection equipment in an emergency core cooling system is a high pressure system and a low pressure system (e.g., see JP H08-114699A).

A high pressure system is a system that can inject a coolant into the reactor core at a pressure even higher than the pressure in the nuclear reactor (approximately 7 MPa) during a rated operation. Examples of high pressure systems include a high pressure core flooder system (HPCF) and a reactor core isolation cooling system (RCIC).

A low pressure system is a system for ensuring that water is injected into the reactor core after the pressure has been lowered by a depressurization system. Examples of low pressure systems include a low pressure core spray system (LPCS) and a residual heat removal system (RHR). A residual heat removal system has various operation modes, examples of which include a containment vessel spray mode, a shutdown cooling mode (decay heat removal), and a suppression chamber cooling mode.

There are also alternative cooling injection systems that are provided for the case where even the above-described emergency core cooling system cannot sufficiently cool the nuclear reactor (e.g., see JP H08-285983A). Examples of alternative cooling injection systems include a make-up water condensate system (MUWC), a fire protection system (FP), and the injection of water by a fire engine or the like. A make-up water condensate system is originally a system for supplying condensate water from a condensate storage tank to equipment in buildings or the like, but can also supply condensate water to the reactor core in an emergency. Note that condensate water is a coolant (water) that is obtained by using a main condenser to cool and condense steam that turned a turbine.

JP H08-114699A proposes that when the emergency core cooling system is operated using emergency power, the high pressure system pump and the low pressure system pump are assigned to different power sections and operated at the same time. The aforementioned document states that doing this makes it possible to reduce the capacity of the emergency diesel generator. JP H08-285983A proposes the use of a steam-water separator storage pool instead of a condensate storage tank as the water source for the emergency reactor core cooling equipment. The aforementioned document states that doing this makes it possible to reduce the capacity of the condensate storage tank and reduce the quality control class and earthquake resistance class to classes that are standard for regular-use equipment.

JP H08-114699A and JP H08-285983A are examples of related art.

As described above, nuclear power plants are provided with several cooling apparatuses as emergency core cooling systems. They are also provided with an alternative cooling injection system for accident management (AM) when the emergency core cooling systems do not function normally.

However, in consequence of the operation of conventional alternative cooling injection systems such as a make-up water condensate system or a fire protection system, the amount of water in the containment vessel increases due to the use of water from outside the containment vessel. If condensate water or the like continues to be injected, and the water level in the suppression chamber (wet-well) surpasses the wet-well venting line, wet-well venting cannot be performed. For this reason, the injection of water from outside of the containment vessel is restricted such that the wet-well venting line is not surpassed, and consequently containment vessel venting is implemented if the pressure in the containment vessel rises. Wet-well venting is processing for releasing a gas in the containment vessel to the outside through the water in the suppression chamber (suppression pool water). This results in the release of radioactive material that should originally be contained in the containment vessel, and thus is processing that should be avoided whenever possible.

Also, if the amount of injected water surpasses the wet-well venting line, dry-well venting is performed using the containment vessel vent. Dry-well venting is processing in which a gas in the reactor containment vessel is discharged directly into the outside air. This gas does not pass through the suppression pool water, and thus has a large influence on the outside. Specifically, if the alternative cooling injection system operates for an extended period of time, radioactive material will be released to the outside due to containment vessel venting, and if the water level in the suppression chamber is not restricted, dry-well venting, which has a large influence on the outside, will be performed.

In view of this, an object of the present invention is to provide an alternative circulation cooling method for an emergency core cooling system that, even if the emergency core cooling system does not operate normally, can prevent the implementation of containment vessel venting by suppressing a rise in pressure and temperature in the containment vessel, and can suppress the implementation of dry-well venting even if containment vessel venting needs to be performed, as well as a nuclear power plant that is capable of the same.

BRIEF SUMMARY OF THE INVENTION

In order to solve the issues described above, an alternative circulation cooling method for an emergency core cooling system according to a representative aspect of the present invention is an alternative circulation cooling method for an emergency reactor core cooling system that is performed at a nuclear power plant that includes a residual heat removal system (RHR) for removing fuel decay heat when a nuclear reactor is shut down and a make-up water condensate system (MUWC) that supplies water from a condensate storage tank into the nuclear reactor, the method including: connecting a downstream side of a heat exchanger of the residual heat removal system (RHR) to an upstream side of a MUWC pump of the make-up water condensate system (MUWC); and cooling water from a suppression chamber using the heat exchanger of the residual heat removal system (RHR) and performing nuclear reactor injecting or containment vessel spraying using the MUWC pump.

According to the above configuration, even if the emergency core cooling system (ECCS) that includes the residual heat removal system does not operate normally, it is possible to suppress a rise in temperature and pressure in the reactor containment vessel by cooling water from the suppression chamber and circulating it to the reactor core. For this reason, it is possible to suppress the implementation of venting due to a rise in pressure, or significantly delay the implementation timing. In particular, the amount of water in the reactor containment vessel does not increase when cooling the reactor core, thus making it possible to suppress a situation in which the water level in the suppression chamber rises and surpasses the venting line. Accordingly, even if venting needs to be performed, it is possible to ensure the implementation of wet-well venting and avoid the implementation of dry-well venting.

In the method described above, the nuclear power plant may include a high pressure core flooder system (HPCF) that supplies water from the condensate storage tank into the nuclear reactor, and the downstream side of the heat exchanger of the residual heat removal system (RHR) may be connected to the upstream side of the MUWC pump of the make-up water condensate system (MUWC) using pipes of the high pressure core flooder system (HPCF). According to this configuration, the downstream side of the heat exchanger of the residual heat removal system (RHR) and the upstream side of the MUWC pump of the make-up water condensate system (MUWC) can be connected without providing a new pipe.

A nuclear power plant according to a representative aspect of the present invention is a nuclear power plant including: a residual heat removal system (RHR) for removing fuel decay heat when a nuclear reactor is shut down, and a make-up water condensate system (MUWC) that supplies water from a condensate storage tank into the nuclear reactor, wherein a bypass line that connects a downstream side of a heat exchanger of the residual heat removal system (RHR) to an upstream side of a MUWC pump of the make-up water condensate system (MUWC) is provided, and wherein water from a suppression chamber can be cooled using the heat exchanger of the residual heat removal system (RHR), and nuclear reactor injecting or containment vessel spraying can be performed using the MUWC pump.

According to the above configuration, even if the emergency core cooling system that includes the residual heat removal system does not operate normally, it is possible to cool water from the suppression chamber and circulate it to the reactor core. In particular, the downstream side of the heat exchanger of the residual heat removal system (RHR) is connected to the upstream side of the MUWC pump of the make-up water condensate system (MUWC) by the bypass line, and thus water does not flow through a pump or a check valve that are arranged on the line for the high pressure core flooder system. Accordingly, there is no risk of the check valve closing, and pressure loss due to the high pressure core flooder pump does not occur, thus making it possible to stably and reliably circulate water.

The method includes connecting the downstream side of an RHR heat exchanger to the upstream side of a MUWC pump, and cooling water from a suppression chamber using the RHR heat exchanger and performing nuclear reactor injecting or containment vessel spraying using the MUWC pump.

Advantageous Effects of Invention

According to the alternative circulation cooling method for an emergency core cooling system and the nuclear power plant of the present invention, even if the emergency core cooling system does not operate normally, it is possible to suppress a rise in temperature in the suppression chamber and suppress dry-well venting.

DETAILED DESCRIPTION OF THE INVENTION

A preferred embodiment of the present invention will be described in detail below with reference to the accompanying drawings. The dimensions, materials, other specific numerical values, and the like in this embodiment are merely illustrative examples for facilitating understanding of the invention, and are not intended to limit the present invention unless otherwise specifically stated. Note that elements having substantially the same functions and configurations in this description and the drawings have been given the same reference signs in order to omit redundant descriptions, and elements not directly related to the present invention have been omitted from the drawings and descriptions.

Figure 1:
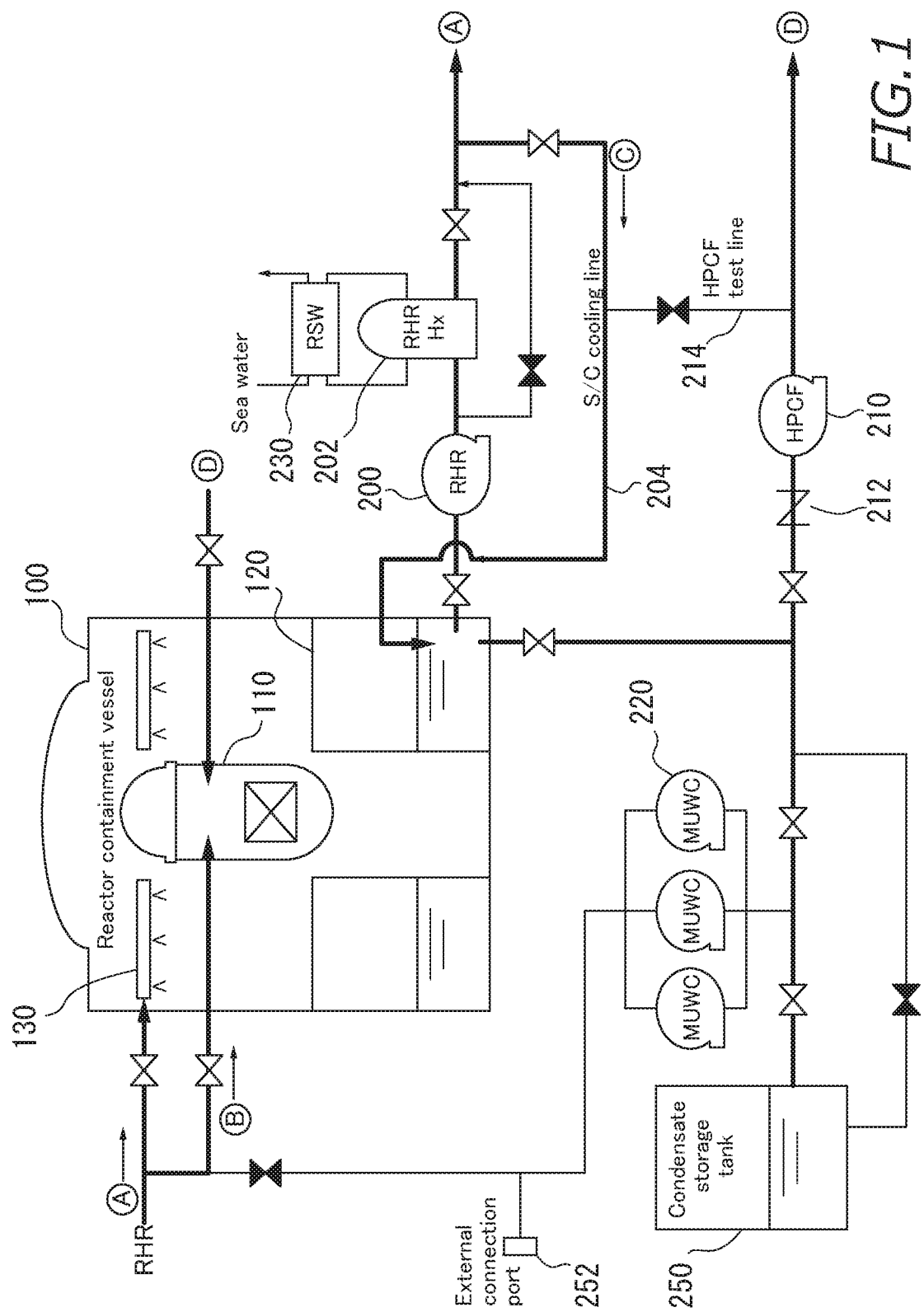
FIG. 1 is a diagram illustrating portions of a conventional nuclear power plant, residual heat removal system, and high pressure core flooder system that are related to the present invention.

FIG. 1 is a diagram illustrating portions of a conventional nuclear power plant, residual heat removal system, and high pressure core flooder system that are related to the present invention. A reactor containment vessel 100 is a piece of equipment that is made of reinforced concrete, and accommodates a reactor pressure vessel 110 in its interior space. The reactor pressure vessel 110 is a piece of equipment that is made of steel, and produces high-temperature and high-pressure steam by reaction of a fuel. The interior of the reactor pressure vessel 110 is called the reactor core. In a boiling water reactor (BWR) or an advanced boiling water reactor (ABWR) type of nuclear power plant, power is generated by directly guiding steam produced by the reactor core to a turbine. The turbine and the main steam pipe that guides the steam are not shown in FIG. 1.

The nuclear reactor injection equipment in an emergency core cooling system uses a high pressure system and a low pressure system. A high pressure system is a system that can inject a coolant into the reactor core at a pressure even higher than the pressure in the nuclear reactor (approximately 7 MPa) during a rated operation. A low pressure system is a system for ensuring that water is injected into the reactor core after the pressure has been lowered by a depressurization system.

In a high pressure core flooder system (HPCF), which is one type of high pressure system, an HPCF pump (high pressure core flooder pump) 210 injects water from the line indicated by D into the reactor pressure vessel 110. The water source for the high pressure core flooder system is a condensate storage tank 250, and it is also possible to use the suppression pool of a suppression chamber 120.

A residual heat removal system (RHR), which is one type of low pressure system, is a system for removing decay heat by cooling the coolant after the nuclear reactor has been shut down for periodic inspection or during an emergency. This system also plays the role of one type of emergency core cooling system (ECCS) by injecting suppression pool water into the reactor core during an emergency in order to maintain the nuclear reactor water level. The residual heat removal system (RHR) includes an RHR pump 200 and an RHR heat exchanger 202. The RHR pump 200 and the RHR heat exchanger 202 are both high-performance and are at least capable of shifting the nuclear reactor to a cold shutdown state.

The residual heat removal system operates in multiple modes. In a containment vessel spray mode, suppression pool water in the suppression chamber 120 is drawn by the RHR pump 200 and cooled by being passed through the RHR heat exchanger 202, and then passes through the line indicated by A and is ejected from spray nozzles 130 in the reactor containment vessel 100. This makes it possible to cool the interior of the reactor containment vessel 100 and maintain the pressure therein. In a low pressure water injection mode, water is injected into the reactor pressure vessel 110 via a feed-water line indicated by B (nuclear reactor injecting) instead of being sent to the spray nozzles 130. Accordingly, the nuclear reactor water level is maintained at an appropriate level, and fuel overheating is prevented.

In a suppression chamber cooling mode, suppression pool water is passed through the RHR heat exchanger 202 and then returned to the suppression chamber 120 via the line indicated by C. The main causes for the temperature rise of the suppression pool water are the discharge of steam due to the operation of safety relief valves during nuclear reactor isolation, and the discharge of steam due to the operation of the reactor core isolation cooling system (RCIC). Note that during reactor core isolation, main steam isolation valves or the like are closed, and the nuclear reactor is isolated from the outside.

In an emergency situation in which the injection of water into the nuclear reactor by the emergency core cooling system (ECCS) is not sufficient during an accident, and there is a risk of the water level in the nuclear reactor decreasing and the reactor core being greatly damaged, an alternative cooling injection system (AM system) is used.

Figure 2:
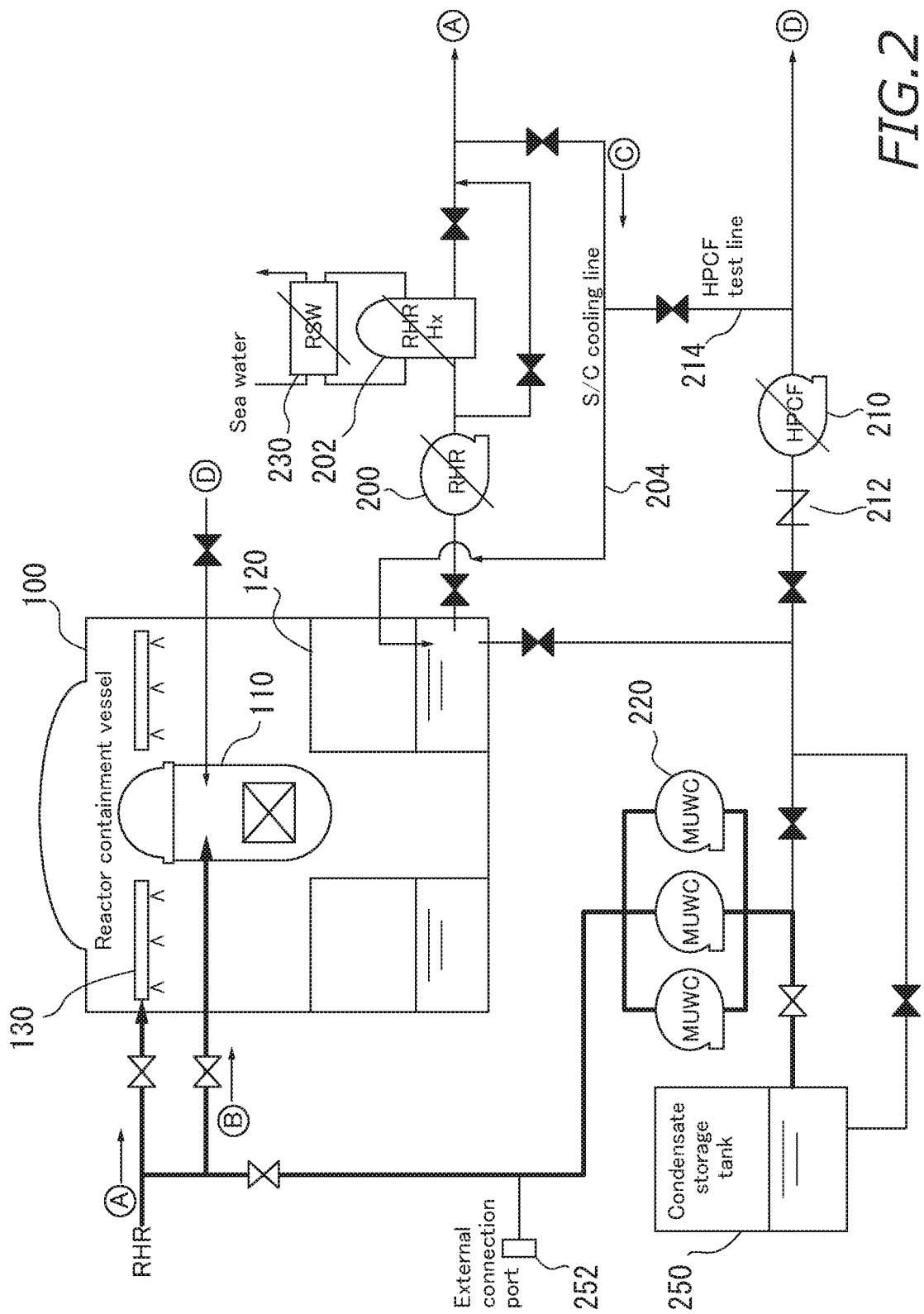
FIG. 2 is a diagram illustrating a make-up water condensate system.

FIG. 2 is a diagram illustrating a make-up water condensate system. The make-up water condensate system (MUWC), which is one type of alternative cooling injection system, is not originally a system for emergencies, but rather a system for supplying condensate water for the daily operation of equipment in buildings or the like. The water source is water in a condensate storage tank 250, and this water is supplied using a MUWC pump 220. When an accident occurs, water in the condensate storage tank 250 can be supplied to the spray nozzles 130 or the reactor pressure vessel 110. If the water in the condensate storage tank 250 is completely depleted when an accident occurs, water can be supplied through the external connection port 252 from a fire engine or the like.

However, as already described above, with an alternative cooling injection system such as a conventional make-up water condensate system or fire protection system, the amount of water in the containment vessel increases. If the alternative cooling injection system operates for an extended period of time, containment vessel venting will need to be performed.

After examination, the inventors of the present invention thought that instead of merely cooling the interior of the reactor containment vessel 100 by injecting water, it is necessary to also cool the suppression pool water that is already in the reactor containment vessel 100. Of course the water in the nuclear reactor and the suppression pool water can be cooled if the residual heat removal system is operating, but situations can be envisioned in which the residual heat removal system cannot operate due to the power supply becoming depleted or malfunctioning, the system becoming submerged in water, or the like. Accordingly, of course the RHR pump 200 does not operate, but also the cooling capability of the RHR heat exchanger 202 is lost due to a reactor building cooling sea water system (RSW) 230 not operating.

However, in order to cool the suppression pool water, it remains that it is preferable to use the RHR heat exchanger 202 in view of the pipe arrangement and capability thereof.

The inventors thus focused attention on the fact that the heat exchanging of the RHR heat exchanger 202 can be implemented by an alternative heat exchanger 232 such as that on a moving vehicle or the like. The inventors then focused attention on the fact that the MUWC pump 220 can be used to supply cooled water into the reactor pressure vessel 110, and arrived at the completion of the present invention.

Specifically, in the present invention, the downstream side of the RHR heat exchanger 202 of the residual heat removal system (RHR) is connected to the upstream side of the MUWC pump 220 of the make-up water condensate system (MUWC). The water in the suppression chamber 120 is thus cooled by the RHR heat exchanger 202, and is injected into the nuclear reactor or sprayed in the containment vessel by the MUWC pump 220.

In particular, with the present invention, circulation using the suppression chamber 120 as the water source can be performed with use of the rise in pressure in the reactor containment vessel 100 caused by an accident. However, the suppression chamber 120 is a piece of equipment that is underground beneath the nuclear reactor building, and is at a lower position than the condensate storage tank 250 that is originally the water source for the MUWC pump 220. For this reason, even if an attempt is made to simply draw water from the suppression chamber 120, the suctioning capability of the MUWC pump 220 will be insufficient. However, when an accident occurs, the pressure in the reactor containment vessel 100 rises and pushes water out from the suppression pool, thus making it possible to ensure a necessary suction head of the MUWC pump 220. In this way, it is possible to establish a new alternative circulation cooling system that is limited to use during an accident.

According to the above configuration, even if the emergency core cooling system (ECCS) that includes the residual heat removal system does not operate normally, it is possible to suppress a rise in temperature and pressure in the reactor containment vessel 100 by cooling water from the suppression chamber and circulating it to the reactor core. For this reason, it is possible to suppress the implementation of containment vessel venting due to a rise in pressure, or significantly delay the implementation timing. In particular, the amount of water in the reactor containment vessel 100 does not increase when cooling the reactor core, thus making it possible to suppress a situation in which the water level in the suppression chamber 120 rises and surpasses the venting line. Accordingly, even if venting needs to be performed, it is possible to ensure the implementation of wet-well venting and avoid the implementation of dry-well venting.

First Embodiment

Figure 3:
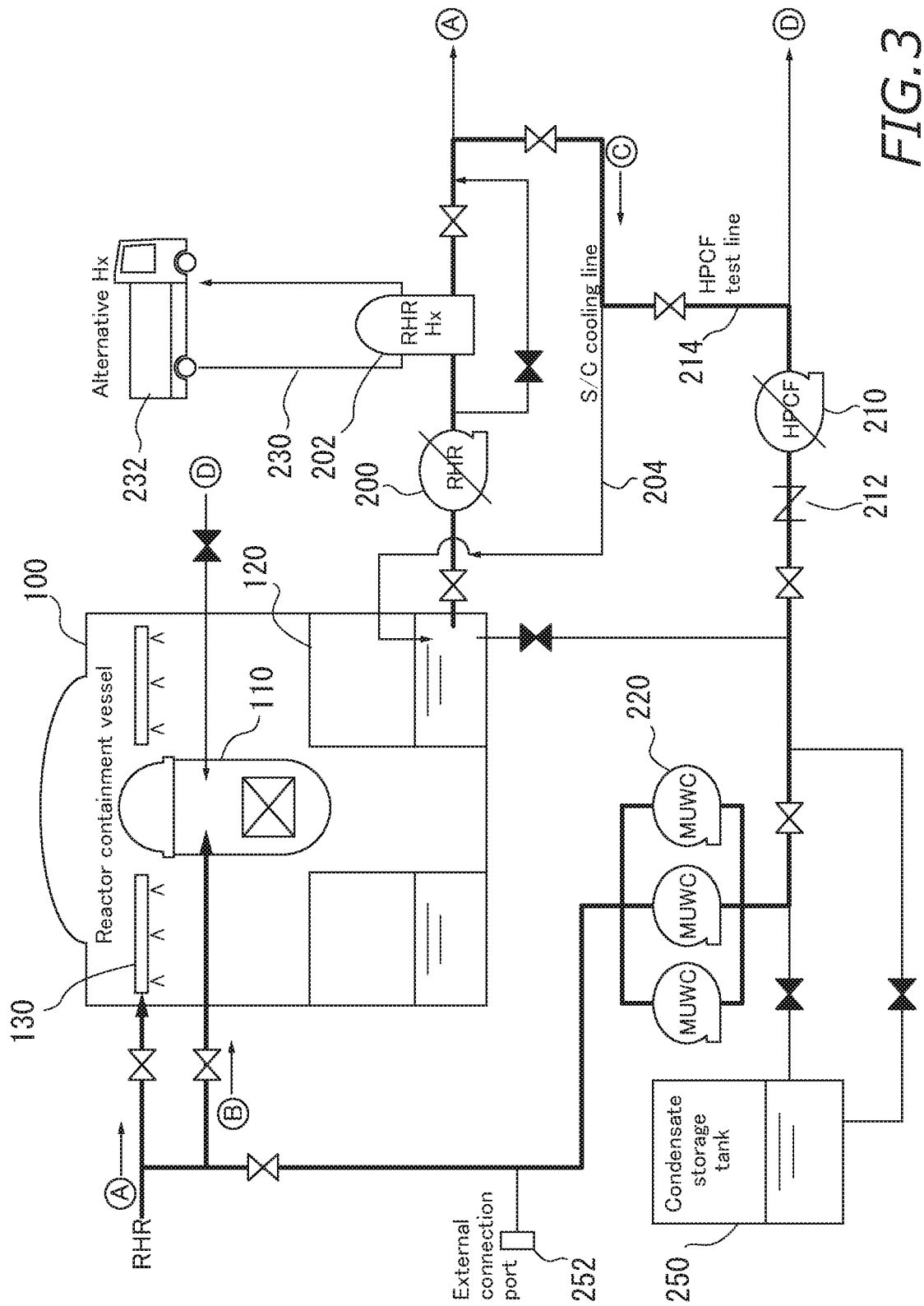
FIG. 3 is a diagram illustrating a first embodiment.

FIG. 3 is a diagram illustrating a first embodiment. In the example in FIG. 3, the downstream side of the RHR heat exchanger 202 is connected to the upstream side of the MUWC pump 220 using pipes in the high pressure core flooder system (HPCF).

The high pressure core flooder system and the make-up water condensate system also use the condensate storage tank 250 as the water source, and pipes directly connected to the condensate storage tank 250 are shared by both of them. Specifically, pipes connected to the MUWC pump 220 are connected to an intermediate portion of pipes that connect the condensate storage tank 250 to the HPCF pump 210. In other words, pipes for a flow in the direction opposite to the normal flow direction exist between the upstream side of the MUWC pump 220 and the HPCF pump 210.

The high pressure core flooder system includes pipes (HPCF test line 214) for circulation to the suppression chamber 120 during operation testing of the HPCF pump 210. In other words, the high pressure core flooder system and the residual heat removal system both have a function (mode) for circulation to the suppression chamber 120. Pipes directly connected to the suppression chamber 120 are shared by both of these functions. Specifically, the HPCF test line 214 is connected to an intermediate portion of pipes (S/C cooling line 204) for the suppression chamber cooling mode of the residual heat removal system. In other words, pipes exist between the downstream side of the RHR heat exchanger 202 and the HPCF pump 210.

In this way, the downstream side of the RHR heat exchanger 202 can be connected to the upstream side of the MUWC pump 220 via the S/C cooling line 204, the HPCF test line 214, and a line for the high pressure core flooder system. There is no need to provide a new pipe, and the above connection can be made by merely controlling the opening and closing of valves, thus making it possible to carry out the present invention without additional construction or capital investment.

Second Embodiment

Figure 4:
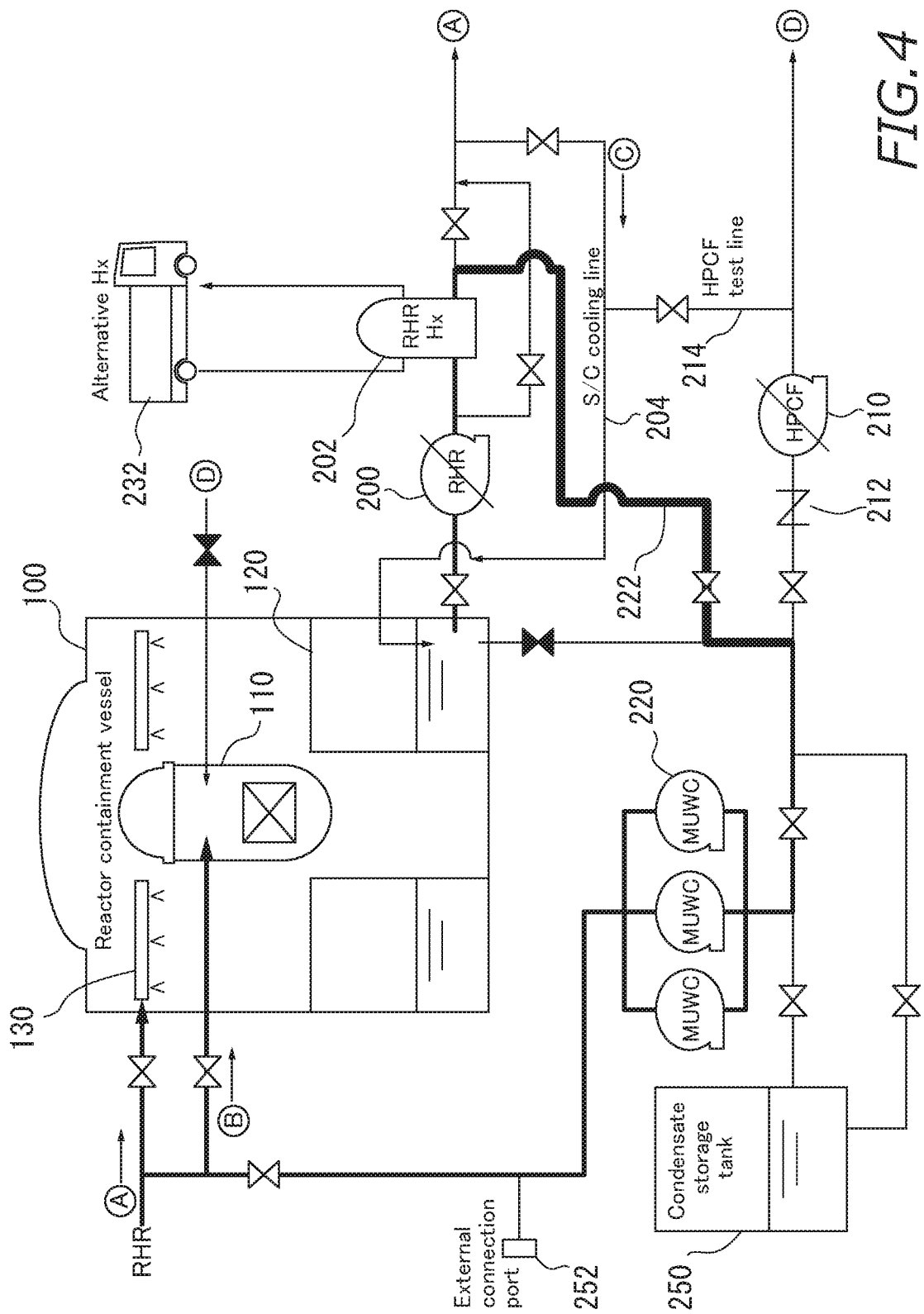
FIG. 4 is a diagram illustrating a second embodiment.

FIG. 4 is a diagram illustrating a second embodiment. In the example in FIG. 4, a bypass line 222 is provided for connecting the downstream side of the RHR heat exchanger 202 to the upstream side of the MUWC pump 220.

In the configuration shown in FIG. 3, the HPCF pump 210 and a check valve 212 are provided on the line for the high pressure core flooder system. The HPCF pump 210 creates flow resistance, and there is a risk of reducing the flow rate. Water flows backwards through the check valve 212. Although the check valve 212 can be fixed in the open state by electric control or manual control, if a large volume of water continues to flow backwards, there is a possibility that the check valve will close. A rise in the radiation level is anticipated at this location when an accident occurs, and it is difficult to perform an on-site check of the state of the check valve if it has closed, and then open it.

In view of this, if the downstream side of the RHR heat exchanger 202 and the upstream side of the MUWC pump 220 are connected by the bypass line 222 as shown in FIG. 4, water does not flow through the HPCF pump 210 or the check valve 212 that are arranged on the line for the high pressure core flooder system. Accordingly, there is no risk of the check valve 212 closing, and pressure loss due to the HPCF pump 210, thus making it possible to stably and reliably circulate water.

Although a preferred embodiment of the present invention has been described above with reference to the accompanying drawings, the present invention is needless to say not limited to this example. A person skilled in the art will appreciate that various modifications and alterations can be made within the scope of the claims, and that all such modifications and alterations are also naturally encompassed in the technical scope of the present invention.

The present invention can be used as an alternative circulation cooling method for an emergency core cooling system at a nuclear power plant, and a nuclear power plant that is suited to the implementation of the same.

What is claimed is:

1. An alternative circulation cooling method for an emergency reactor core cooling system that is performed at a nuclear power plant that includes a residual heat removal system (RHR) for removing fuel decay heat when a nuclear reactor is shut down and a make-up water condensate system (MUWC) that supplies water from a condensate storage tank into the nuclear reactor, the alternative circulation cooling method comprising:
    connecting a downstream side of a heat exchanger of the residual heat removal system (RHR) to an upstream side of a MUWC pump of the make-up water condensate system (MUWC); and
    cooling water from a suppression chamber using the heat exchanger of the residual heat removal system (RHR) and performing nuclear reactor injecting or containment vessel spraying using the MUWC pump.

2. The alternative circulation cooling method according to claim 1, wherein:
    the nuclear power plant includes a high pressure core flooder system (HPCF) that supplies water from the condensate storage tank into the nuclear reactor; and
    the downstream side of the heat exchanger of the residual heat removal system (RHR) is connected to the upstream side of the MUWC pump of the make-up water condensate system (MUWC) using pipes of the high pressure core flooder system (HPCF).

* * * * *